(12) United States Patent
Bishop et al.

(10) Patent No.: US 10,169,901 B2
(45) Date of Patent: Jan. 1, 2019

(54) STAGGERED ANIMATION SCHEDULING

(75) Inventors: Jesse Bishop, Redmond, WA (US);
Ruurd Johan Boeke, Redmond, WA (US); Terry Adams, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 12/971,994

(22) Filed: Dec. 17, 2010

(65) Prior Publication Data

US 2012/0159360 A1 Jun. 21, 2012

(51) Int. Cl.
*G06T 13/00* (2011.01)
*G06F 3/0481* (2013.01)

(52) U.S. Cl.
CPC ............ *G06T 13/00* (2013.01); *G06F 3/0481* (2013.01)

(58) Field of Classification Search
CPC ...................................... G06T 13/00
USPC ........................................ 345/473
See application file for complete search history.

(56) References Cited

U.S. PATENT DOCUMENTS

| 6,049,336 A | 4/2000 | Liu et al. |
| 6,956,574 B1 | 10/2005 | Cailloux et al. |
| 7,194,699 B2 | 3/2007 | Thomson et al. |
| 7,432,928 B2 | 10/2008 | Shaw et al. |
| 2003/0179230 A1 | 9/2003 | Seidman |
| 2009/0150813 A1 | 6/2009 | Chang et al. |

FOREIGN PATENT DOCUMENTS

CN 1776672 5/2006

OTHER PUBLICATIONS

Likness, "Model-View-ViewModel (MVVM) Explained," Aug. 8, 2010, retreived from http://www.codeproject.com/Articles/100175/Model-View-ViewModel-MVVM-Explained, p. 1-13.*
Ritscher, "XAML Wonderland," Jun. 30, 2009, retrieved from http://blog.wpfwonderland.com/2009/06/30/arranging-shapes-in-circle-with-expression-blend-part-2/, p. 1-15.*
"Stagger jQuery Animations," Dec. 30, 2009, retreived from http://stackoverflow.com/questions/1981645/stagger-jquery-animations, p. 1-2.*
Tozon, "Countdown to Silverlight 3 #10: Animation Easing," Jul. 12, 2009, retrieved from http://tozon.info/blog/post/2009/07/12/Countdown-to-Silverlight-3-10-Animation-easing.aspx, p. 1.*
"JQuery API—animate," Jan. 2010, retrieved from https://web.archive.org/web/20100119052543/http://api.jquery.com/animate/ on Apr. 10, 2015.*

(Continued)

*Primary Examiner* — Ryan D McCulley
(74) *Attorney, Agent, or Firm* — Dicke, Billig & Czaja, PLLC

(57) ABSTRACT

A timing function that distributes progressive start times of a series of target animations, or staggers animations, is disclosed. The timing function includes a set of selectable parameters that are used to create a customized staggering animation in the user interface. The set of selectable parameters includes a user interface geometry for each of the target animations.

20 Claims, 2 Drawing Sheets

(56) References Cited

OTHER PUBLICATIONS

Brown. "Creating Custom Easing Functions in WPF 4 (and Silverlight)." Nov. 2009. Retrieved from http://dzone.com/articles/creating-custom-easing on Dec. 16, 2016.*

Komatineni, "Understanding Animation," 2008, retrieved from http://www.satyakomatineni.com/akc/display?url=DisplayNoteIMPURL&reportId=2898 on Nov. 2, 2017.*

Weber, Markus., "Animations in User Interface Design: Essential Nutrient Instead of Eye Candy", Retrieved at <21 http://www.centigrade.de/en/blog/article/animations-in-user-interface-design-essential-nutrient-instead-of-eye-candy >>, Jan. 31, 2010, pp. 9.

Khan, Faisal., "Animation in-depth with Silverlight 2.0 Beta—Part Five", Retrieved at <<http://dotnetslackers.com/articles/silverlight/Animation-In-Depth-With-Silverlight-2-0-Beta5.aspx >>, Jun. 13, 2008, pp. 11.

Notice on the First Office Action for Chinese Application No. 201110444240.7, dispatched Dec. 30, 2013 (3 pages).

* cited by examiner

STAGGERED ANIMATION SCHEDULING

BACKGROUND

Animation is an illusion that is created by quickly cycling through a series of images, each slightly different from the last. Someone viewing the animation perceives the group of images as a single changing scene such as motion in the scene. Many user interfaces in software applications make use of animations to provide user interaction feedback, highlight context transitions, or draw attention to particular information. Examples of animations in user interfaces are legion. Animation can provide a depress-and-return motion to an on-screen "button" selected with a pointer device or a finger, and can provide a page turn effect as a user scrolls through a document. The use of motion provided with the animations can provide a highly desirable effect within the application.

To achieve certain effects, a user interface designers may stagger animations, i.e., arrange the order of animations in some meaningful fashion as a function of time, in order to provide a user with appropriate visual context for a series of animations. An example can include a series of animations, such as list items or "bullet points," added to a screen in succession or one after the other as a function of time. Another example can include a user interface element such as an animal animated to run to a person, and then the person animated to pet the animal. Without an ability to stagger the animation of these elements, the motions would occur at the same time, and the meaning of the animations would be lost. The creation of staggering animations is difficult in application frameworks, however, and requires a developer to provide a custom code in each case that results in inefficiencies when designing user interfaces.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a timing function that distributes progressive start times of a series of target animations, or staggers animations. The timing function includes a set of selectable parameters that are used to create a customized staggering animation in the user interface. The set of selectable parameters includes a user interface geometry of each of the target user interface elements being animated. The timing function provides a reusable tool for applying staggering animations, and the particular parameters are selected to customize the staggering animation in the user interface. The timing function is stateless and could be reused with the same or different parameters in any application framework or system to control the staggering behavior of a set of animations that are executed within the shared context of an overall user interface layout change.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
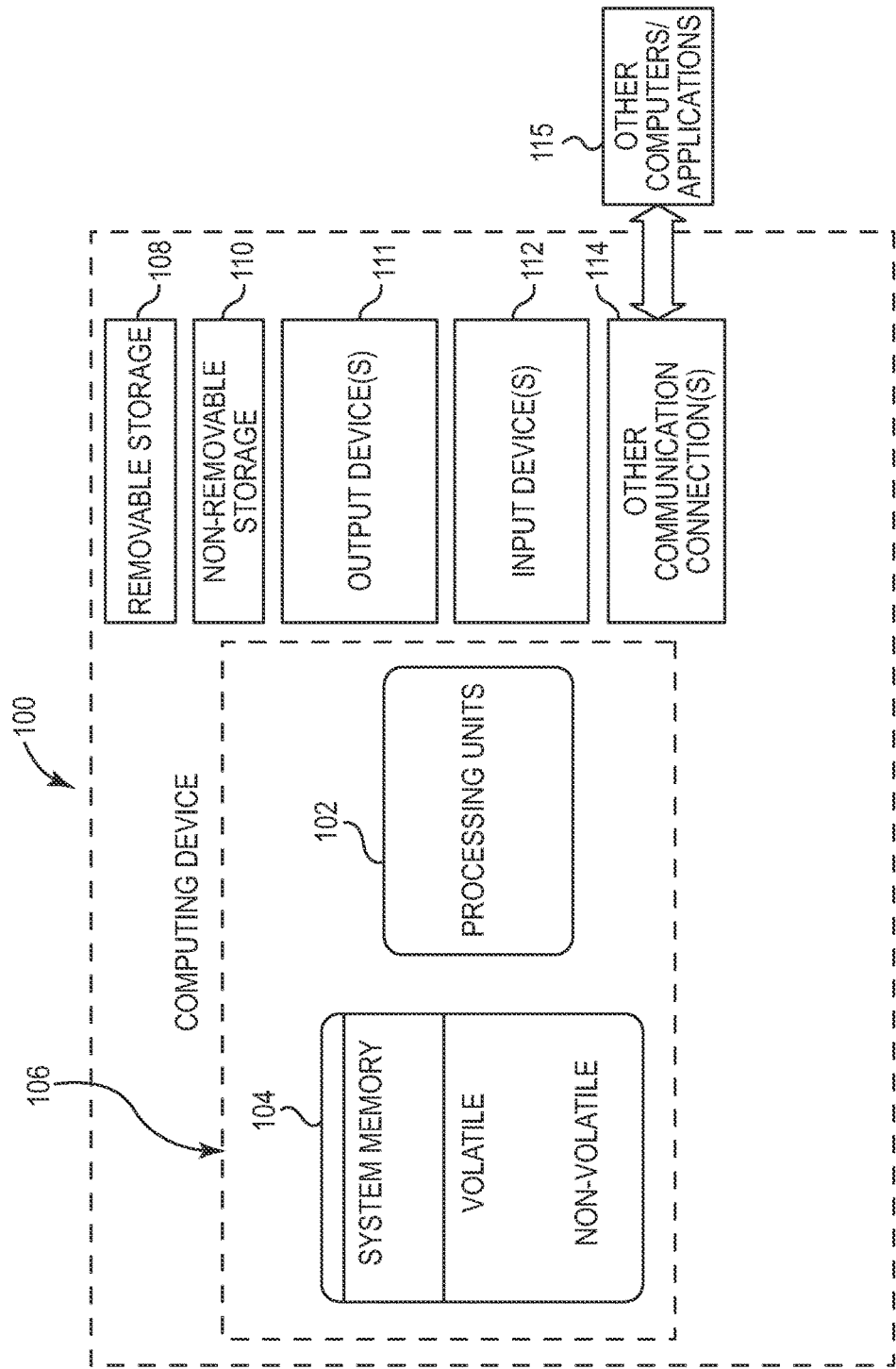
FIG. 1 is a block diagram illustrating an example computing device.

FIG. 1 illustrates an exemplary computer system that can be employed as a component in an operating environment such as a distributed computing system or other form of computer network. Computer systems can be used to prepare or run computer applications having staggered animations.

The exemplary computer system includes a computing device, such as computing device 100. In a basic configuration, computing device 100 typically includes a processor system having one or more processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create software programs, such as applications, to run in the managed environment. Software applications can include mobile applications, thin client applications, rich client applications, web applications, rich Internet applications, and the like.

In general, a web application is an application that is accessed over a network such as the Internet or other form of computer network. An example of a web application can include a computer software application hosted in a browser-controlled environment or coded in a browser-supported language, combined with a browser-rendered markup language and can use a web browser to render the application executable. Other example web applications can include browser plug-in computer software applications or internet-connected standalone computer software applications, which do not require browser rendering or browser-supported languages and can execute entirely outside of the browser. Web applications can provide the convenience of using a web browser as a client. Also, web applications can be updated and maintained without distributing and installing software on potentially thousands of client computers and provides support for cross-platform compatibility. Rich Internet applications are usually web applications with a rich graphical user interface delivered to users by way of a site-specific browser, a browser plug-in, independent sandboxes, or virtual machines. A rich Internet application can provide a dynamic and responsive user experience or use streaming media, and be widely accessible on a range of devices and platforms. Software applications can be developed or created with a number of development tools, such as is an Integrated Development Environment (IDE). An example IDE is available under the trade designation of "Visual Studio" from Microsoft, Inc. of Redmond, Wash., USA.

Figure 2:
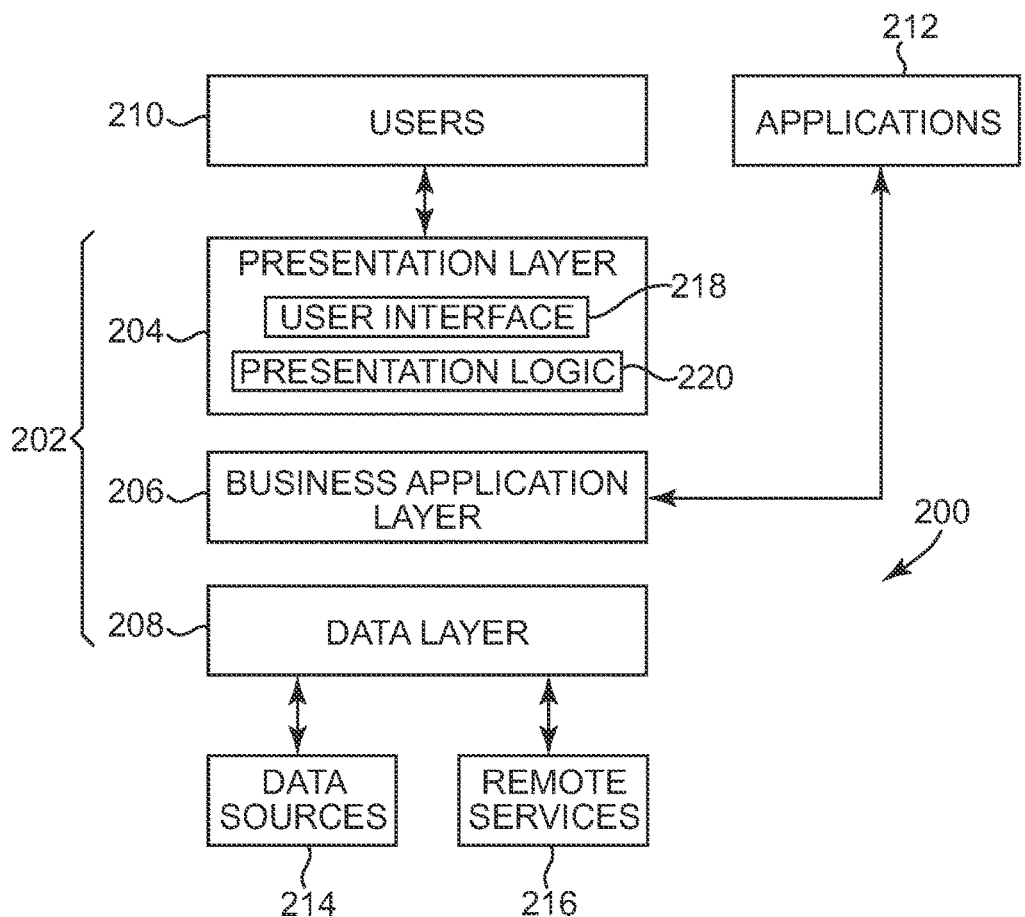
FIG. 2 is a schematic diagram illustrating an example of a logical architecture of a system configured for the computing device of FIG. 1.

FIG. 2 illustrates an example logical architecture of a system 200 at a high level of abstraction and is often used by developers of software applications, such as web applications or rich Internet applications. The logical architecture of the system 200 can be considered as a set of cooperating components grouped into layers. Application 202 in the example is configured in a common three-layer design including a presentation layer 204, a business application layer 206, and a data layer 208. Other layers in the application 202 are possible, such as a services layer, and other configurations are possible. The application 202 is configured to include relationships with users 210, other applications 212 that call services implemented within the business application layer 206, data sources 214 such as relational databases or Web services that provide access to data, and external or remote services 216 that are consumed by the application.

As referred to here, layers are distinguishable from tiers even though both layers and tiers can use the same set of names (presentation, business, services, and data). Layers describe logical groupings of the functionality and components in an application 202; whereas tiers describe the physical distribution of the functionality and components on separate servers, computers, networks, or remote locations and imply a physical separation. For example, more than one layer can be located on the same physical machine (i.e., the same tier). Tiers are often configured in physical distribution patterns such as two-tier, three-tier, and n-tier, and the like.

Layers often group components by general functionality and include components that allow the different layers to work together. The presentation layer 204 includes a user-oriented functionality configured to manage user interaction with the system and can also include components that provide a common bridge into core business logic encapsulated in the business application layer 206. The business application layer 206 typically implements a core functionality of the system 200, and encapsulates relevant business logic. It can also include components that can expose service interfaces for other callers. The data layer 208 typically provides access to data hosted within the boundaries of the system 200, and can also access data exposed by other networked systems. The data layer 208 also exposes generic interfaces that components in the business layer 206 can consume.

The presentation layer 204 includes components that implement and display the user interface and manage user interaction. The presentation layer 204 includes controls for user input and display, in addition to components that organize user interaction, generally including user interface components 218 and presentation logic components 220. User interface components 218 include the application's 202 visual elements used to display information to the user and accept user input. Presentation logic components 220 include the application code that defines the logical behavior and structure of the application in a way that is generally independent of any specific user interface implementation.

User interface designers have difficulty efficiently staggering animations in an application framework where the logic and presentation layers of an application are separated. In general, applying staggering behavior to a series of animations can involve application logic that would typically be written by a developer of the application as custom code. One common approach to building staggering animations involves executing custom user code when an application is running that determines the animation staggering behavior at the start of each animation. The custom code is then created for each application and staggering animation event, which reduces productivity and negatively impacts application performance and asset reuse. This disrupts the designer-developer workflow, and more closely ties an application's presentation and logic, which is inapposite to the architectural policy of decoupling the presentation and logic wherever possible.

Figure 3:
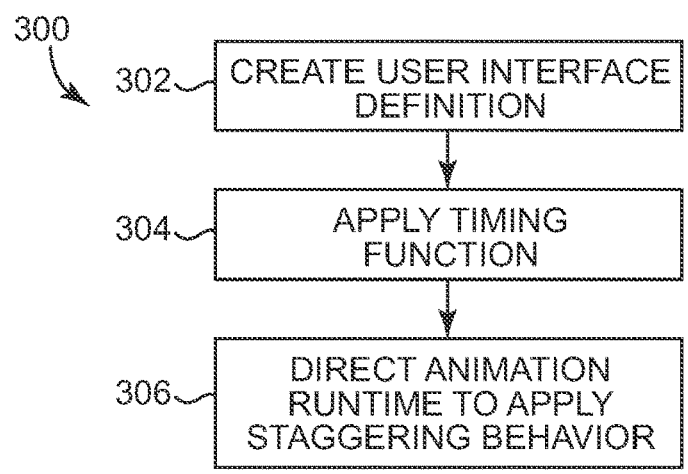
FIG. 3 is a block diagram illustrating a method of staggering animations in the logical architecture of FIG. 2.

FIG. 3 illustrates a method 300 for generating staggering animations in a given application framework. A user interface definition is created at 302. In one example, a user interface designer creates the user interface definition within the presentation layer 204. The user interface definition applies a timing function component at 304 to distribute progressive start times of a series of target animations. In the example, an application developer creates the timing function in a style generally described in a tradition designer-developer work-flow involved with user interface definitions within the application framework not involving staggering animations. The timing function within the user interface definition directs the animation runtime to apply animation staggering behavior to target user interface elements at 306.

Method 300 can be implemented into design patterns supporting the layered architectural style such as separated presentation patterns. Separated Presentation patterns can allow graphical designers to create a user interface while developers generate the code to drive it. Examples of separated presentation patterns in the presentation layer include Model-View-Controller (MVC) or Model-View-ViewModel (MVVM), which divide user interface processing concerns into distinct roles. The Model aspect of the MVC and MVVM patterns represents data, such as a domain model that includes business rules, and the View aspect represents the user interface. The roles promote reusability. In this case, the timing function can be implemented within the View aspect of the MVC or MVVM patterns and permits the timing function to exist exclusively within the presentation layer 204.

The timing function distributes progressive start times of a series of target animations. The timing function includes a set of selectable parameters that are used to create a customized staggering animation in the user interface. The set of selectable parameters includes a user interface geometry of each of the target animations. Thus, the user interface geometry can be used to control the start times of the series of target animations and allows the progressive start times to occur in a both a linear and nonlinear manner.

The timing function in this example provides a reusable tool for applying staggering animations, and the particular parameters are selected to customize the staggering animation in the user interface. The timing function is stateless and could be reused with the same or different parameters in any application framework or system to control the staggering behavior of a set of animations that are executed within the shared context of an overall user interface layout change.

An example timing function can be implemented as an interface declaration with the following code:

```
public interface ILayoutTransitionStaggerFunction
{
    TimeSpan GetTransitionDelay(
        FrameworkElement targetElement,
        IList<Rect> transitioningElementBounds,
        int elementIndex
    );
}
```

The example code is expressed in C-sharp programming language (C#), which is compatible with development technologies such as those sold under the trade designations "Silverlight" or "Windows Presentation Foundation" available from Microsoft, Inc., although one skilled in the art can express the example code in many other computer languages and technologies.

As used in this declaration, the parameter of FrameworkElement targetElement can include any user interface element that is being animated in the given animation, i.e., the target of the given animation. The parameter of IList<Rect> transitioningElementBounds includes an ordered list of the bounded surface areas (here described as rectangular areas in <Rect>) of a set of user interface elements that are being targeted by other animations within the context of the current user interface. The parameter of int elementIndex includes the index of the target user interface element (targetElement), within the ordered collection of element bounds (transitioningElementBounds).

The example interface declaration represents a reusable timing function that can be customized and implemented concretely by specifying the parameters for each use. The concrete implementation can also be reused declaratively in a user interface definition without further code or input.

The following example includes a concrete timing function that would distribute animations along a quadratic curve based on an index provided to each element:

```
public class QuadraticIndexStaggerFunction :
LayoutTransitionStaggerFunctionBase
    {
        public override TimeSpan
GetTransitionDelay(FrameworkElement targetElement,
IList<Rect> transitioningElementBounds, int elementIndex)
        {
            double normalizedIndex = 1d /
(Convert.ToDouble(transitioningElementBounds.Count) /
Convert.ToDouble(elementIndex + 1));
                return TimeSpan.FromMilliseconds(200 * normalizedIndex
* normalizedIndex);
        }
    }
```

A user interface designer can reuse the concrete implementation to stagger animations in other applications. The concrete implementation can be expressed in a user interface markup language such as XAML (extensible application markup language), which is commonly used in "Silverlight" and "Windows Presentation Foundation" technologies to define user interface elements. An example of a concrete implementation in XAML provides:

```
<AnimationConstruct>
<AnimationConstruct.StaggeringBehavior>
<local:QuadraticIndexStaggerFunction/>
</AnimationConstruct.StaggeringBehavior>
<Storyboard>
<DoubleAnimation Storyboard.TargetProperty="Width" To="300" />
</Storyboard>
</AnimationConstruct>
```

The underlying animation runtime in an application framework is then able to automatically parse the markup and apply the staggering behavior to the supplied animations at runtime.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. A method of staggering animations in a user interface, comprising:

applying a predefined timing function in a first code to distribute progressive start times of a series of target animations within a set of selectable parameters, wherein the predefined timing function includes a set of selectable non-linear start times within an application framework including staggering animations, the application framework including a logic layer defining the first code as a concrete implementation separate from a presentation layer defining reusable user interface elements of the concrete implementation, the predefined timing function including a function definition having the set of selectable parameters as function parameters passed to the predefined timing function from another code;

the set of selectable parameters includes an index of a user interface geometry applied to each of the target animations and location bounds of the user interface during the target animations and an order list of bounded surface areas of other animations independent of the target animations within the user interface;

implementing the predefined timing function into a user interface definition to generate the user interface elements of the concrete implementation in a presentation layer by specifying first parameters for use with the set of selectable parameters in a declaration as a markup, the predefined timing function re-implemented without modification to the first code by specifying second parameters for use with the set of selectable parameters, the implementing created in the presentation layer of a workflow of the predefined timing function; and parsing the markup to apply staggering behavior at runtime.

2. The method of claim 1 wherein the timing function is a stateless timing function.

3. The method of claim 2 wherein the user interface is included in a presentation layer of an architecture, and the predefined timing function is exclusively within a business layer.

4. The method of claim 3 wherein the stateless timing function is included within a Model-View-ViewModel pattern.

5. The method of claim 1 wherein the progressive start times are distributed nonlinearly.

6. The method of claim 5 wherein the progressive start times are distributed according to a quadratic function.

7. The method of claim 1 wherein the user interface geometry includes a selectable parameter indicating an element of the user interface to be animated.

8. The method of claim 7 wherein a plurality of elements of the user interface are to be animated within the user interface geometry.

9. The method of claim 8 wherein the user interface geometry includes a selectable parameter including a list of bounded areas of the plurality of elements of the user interface targeted by animations.

10. The method of claim 9 wherein each of the elements within the bounded areas includes an index.

11. A computer readable storage medium, which does not include transitory propagating signals, storing computer executable instructions for controlling a computing device to perform a method comprising:

creating a user interface definition in a presentation layer with a set of selectable parameters including a selectable parameter as an index for a target animation element and a selectable parameter for locations bounds of target animations in an application framework and an ordered list of bounded surface areas of other animations independent of the target animation element within the user interface, the application framework including a logic layer defining the first code as a concrete implementation separate from a presentation layer defining reusable user interface elements of the concrete implementation; and applying a predefined timing function created in a first code to stagger animation start times, wherein the timing function includes selectable non-linear start times related to the target animation element within an application framework including staggering animations, and wherein the predefined timing function directs an animation runtime to apply animation staggering behavior to the target animation element, the predefined timing function including a function definition having the set of selectable parameters as function parameters passed to the predefined timing function from another code;

implementing the predefined timing function into a user interface to generate the user interface elements of the concrete implementation by specifying first parameters for use with the set of selectable parameters in a declaration as a markup, the predefined timing function re-implemented without modification to the first code by specifying second parameters for use with the set of selectable parameters, the implementing created in the presentation layer of a workflow of the predefined timing function; and parsing the markup to apply staggering behavior at runtime.

12. The computer readable storage medium of claim 11 wherein creating a user interface definition for a target animation element includes creating a user interface definition for a plurality of target animation elements.

13. The computer readable storage medium of claim 11 wherein the reusable timing function also linearly staggers animation start times.

14. The computer readable storage medium of claim 11 wherein the reusable timing function is stateless.

15. The computer readable storage medium of claim 14 wherein the reusable timing function is exclusively within a business layer of an application.

16. The computer readable storage medium of claim 15 wherein the reusable timing function is included in a View of a pattern in the presentation layer.

17. The computer readable medium of claim 16 wherein the View is included in a Model-View-ViewModel pattern.

18. The computer readable medium of claim 15 wherein the application is a web application.

19. The computer readable medium of claim 11 wherein the selectable parameters are related to a user interface geometry of the target animation element.

20. A system, comprising:

a memory to store a set of instructions; and a processor to execute the set of instructions to:

apply a predefined timing function in a first code to distribute progressive start times of a series of target animation elements within a set of selectable parameters, the timing function includes a set of selectable non-linear start times within an application framework including staggering animations, the application framework including a logic layer defining the first code as a concrete implementation separate from a presentation layer defining reusable user interface elements of the concrete implementation, the predefined timing function includes a function definition having the set of selectable parameters as function parameters passed to the predefined timing function from another code;

the set of selectable parameters includes an index of a geometry of a target user interface element and an ordered list of bounded surface areas of a set of user interface elements of other animations independent of the target animation elements within the context of the user interface;

implement the predefined timing function into a user interface definition to generate the user interface elements of the concrete implementation in a presentation layer by specifying first parameters for use with the set of selectable parameters in a declaration as a markup, the predefined timing function can be re-implemented without modification to the first code by specifying second parameters for use with the set of selectable parameters, the predefined timing function created in the presentation layer of a workflow; and parse the markup to apply staggering behavior at runtime.

* * * * *